Sept. 2, 1958     C. W. BACHMAN     2,849,822
FLORAL WREATH
Filed May 13, 1957
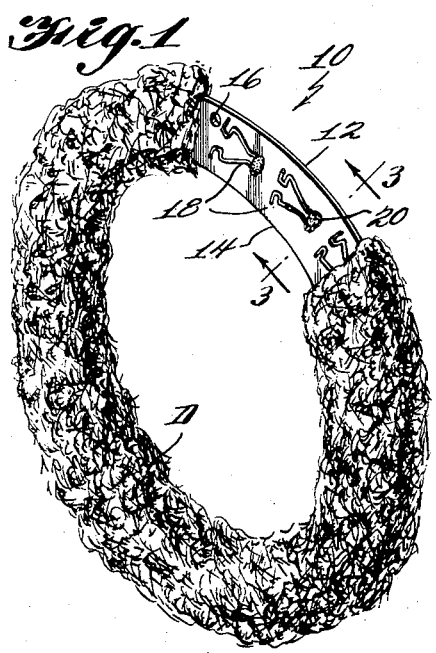
Fig. 1
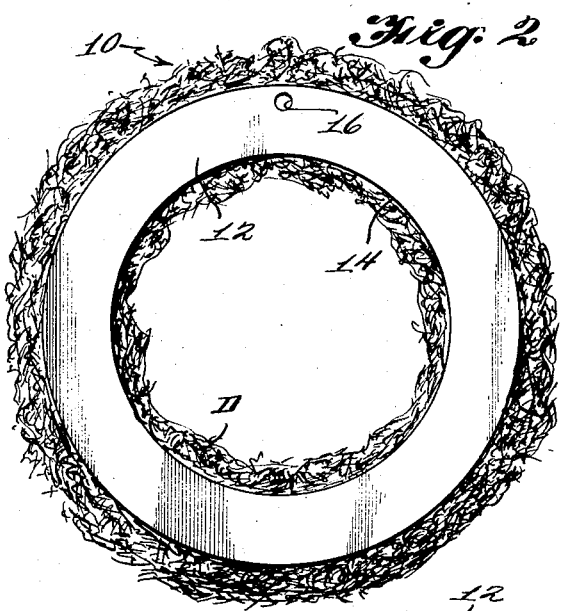
Fig. 2
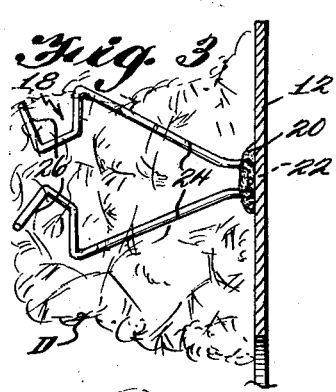
Fig. 3
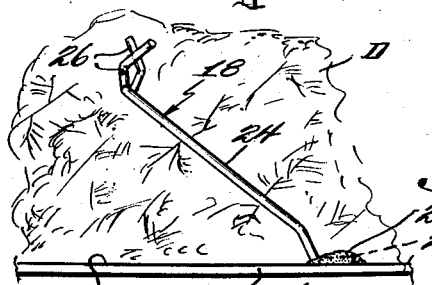
Fig. 4
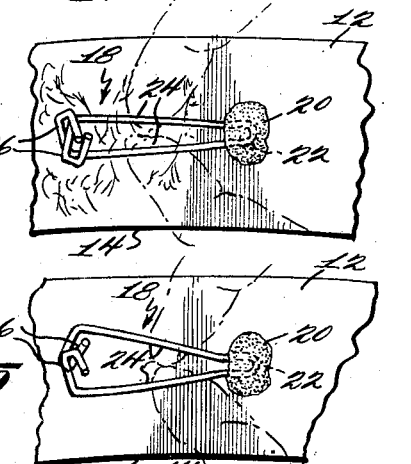
Fig. 7
Fig. 6
Fig. 5
INVENTOR
CLARA BACHMAN
BY *Stone & Mack*
ATTORNEYS.

United States Patent Office 2,849,822
Patented Sept. 2, 1958

2,849,822

FLORAL WREATH

Clara Willis Bachman, Culpeper, Va.

Application May 13, 1957, Serial No. 658,761

3 Claims. (Cl. 41—12)

This invention relates to a decorative floral structure and to an improvement in the means for securing the decorative material to a base structure.

An important feature of this invention is a simple and yet novel structure comprising a fastening means for securing and arranging decorative material upon its base and having fasteners only on one side of the base thus providing an uninterrupted flat rear surface of the base for flush engagement with any surface upon which it is employed.

Another feature of this invention is a decorative structure having a fastening means that is resilient and almost imperceptible to the sight and light to the touch, when within and surrounded by a portion of the decorative material.

Another feature is a fastening means that requires the same effort to release the decorative material as when securing this material thus minimizing the effort necessary to replace or rearrange the material upon its base.

A further feature relates to a fastening means that is not dependent upon the succeeding unit of decorative material to overlay it and thus cover it from detection.

Other objects and advantages will be apparent from the following description when considered in light of the accompanying illustrations in which one embodiment of the invention is shown. In the drawings:

Fig. 1 is a perspective view of a floral arrangement in the form of a wreath;

Fig. 2 is an elevation of the rear side of the wreath shown in Fig. 1;

Fig. 3 is an enlarged detail view of one of the fastening elements taken on the line 3—3 of Fig. 1;

Fig. 4 is a side elevation of the fastener shown in Fig. 3;

Fig. 5 is a fragmentary plan view of one of the fasteners positioned for receiving the decorative material;

Fig. 6 is a fragmentary plan view of one of the fasteners under compression and with decorative material impaled upon it;

Fig. 7 is a fragmentary plan view of one of the fasteners in open and hooked position.

Referring to the drawings, numeral 10 designates a decorative wreath having an annular base plate 12 of thin sheet metal with an opening 14 positioned at its center, thereby forming a ring-like base to which the decorative material D is to be secured. The decorative material D, as shown, is of an evergreen type, but the use of other types of floral decoration is obvious. An aperture 16 is located at the upper edge of the base 12 for the purpose of hanging the wreath in a vertical position.

Positioned concentrically upon the face of the base plate 12 are a plurality of evenly spaced fastening members 18, secured by spot welding or the like, as at 20. The fastening elements 18 are constructed from a single length of spring-like wire bent at a point 22 an equal distance from either end of the wire. The arms 24 of the fastening members 18 project at an acute angle away from the face of the base plate 12, and have an angle of repose that is divergent one from another. The arms 24 of the fastening members 18 terminate in hook-like ends 26 of identical shape but reversed one from another, and are so designed as to engage and interlock with the inner structure of the decorative material that has been impaled upon them.

As is best seen in Figs. 5, 6 and 7, finger pressure is applied against the arms 24 of the members 18 until the arms are forced into substantially parallel alignment. A group of decorative material is then thrust upon the arms 24 causing the hook-like ends 26 to become embedded within the portion of the decorative material as applied. The finger pressure is then released and as the arms 24 move away from one another their hook-like ends 26 become entangled and hooked within the central confines of the decorative material D, thus providing a secure but resilient application of the decorative material D upon the base 12.

Although the structure shown and described has a wreath-like configuration, its adaptability to other shapes and forms is obvious.

I claim:

1. A decorative wreath having an annular ring-shaped base, a plurality of resilient U-shaped fasteners arranged concentrically upon said base, the base of the U-shaped members being secured to the ring-shaped base and the free arms of the U-shaped fastener extending at an acute angle away from the ring-shaped base, and hook-shaped fastening elements on the outer ends of each of the arms of said U-shaped fastener.

2. A decorative wreath structure comprising a ring-shaped base, a plurality of fastening devices affixed to one face of said base for mounting decorative material on said base, each said device having two arms extending at an acute angle away from said base and adapted to receive and hold decorative material between their outer end portions, the combined decorative material held by all of said fastening devices serving to hide said base and arms.

3. A decorative wreath structure comprising a ring-shaped base, a plurality of fastening devices affixed to one face of said base for mounting decorative material on said base, each said device having two arms of spring-like material extending at an acute angle away from said base and adapted to receive and hold decorative material between their outer end portions, the combined decorative material held by all of said fastening devices serving to hide said base and arms.

References Cited in the file of this patent

UNITED STATES PATENTS

| | | |
|---|---|---|
| 1,232,527 | Germmill | July 10, 1917 |
| 1,336,249 | Ludwig | Apr. 6, 1920 |
| 2,761,233 | Brown | Sept. 4, 1956 |